United States Patent [19]

Dardaine et al.

[11] 3,901,376

[45] Aug. 26, 1975

[54] CONTINUOUSLY OPERATING DEVICE FOR CONVEYING AND SELECTING CASES

[75] Inventors: Edgar Dardaine, Sorel Moussel; Jean-Luc Berry, Mesnil sur L'Estree, both of France

[73] Assignee: E. P. Remy et Cie, Dreux, France

[22] Filed: Mar. 25, 1974

[21] Appl. No.: 454,785

[30] Foreign Application Priority Data
Apr. 10, 1973   France .............................. 73.12936

[52] U.S. Cl. ..................... 198/34; 53/247; 53/250; 214/308
[51] Int. Cl.² ......................................... B65G 47/26
[58] Field of Search ...... 198/34, 102; 214/308, 309; 53/247, 250, 251

[56] References Cited
UNITED STATES PATENTS
3,270,859   9/1966   Bargel ............................ 214/309 X
3,366,222   1/1968   Rowckamp ..................... 198/34
3,721,330   3/1973   Crowford et al ..................... 198/34

Primary Examiner—Richard A. Schacher
Assistant Examiner—Douglas D. Watts
Attorney, Agent, or Firm—Kenyon & Kenyon Reilly Carr & Chapin

[57] ABSTRACT

The present invention relates to a device for conveying cases, boxes or manufactured articles under the gripping members of an encasing-uncasing machine. This device essentially includes a selector system comprising a main conveyor, a device for retaining the cases provided with series of tappets moving in translation at a constant speed much lower than that of the main conveyor, and a conveyor for extracting the cases driven in translation at a constant speed equal to that of the main conveyor.

8 Claims, 6 Drawing Figures

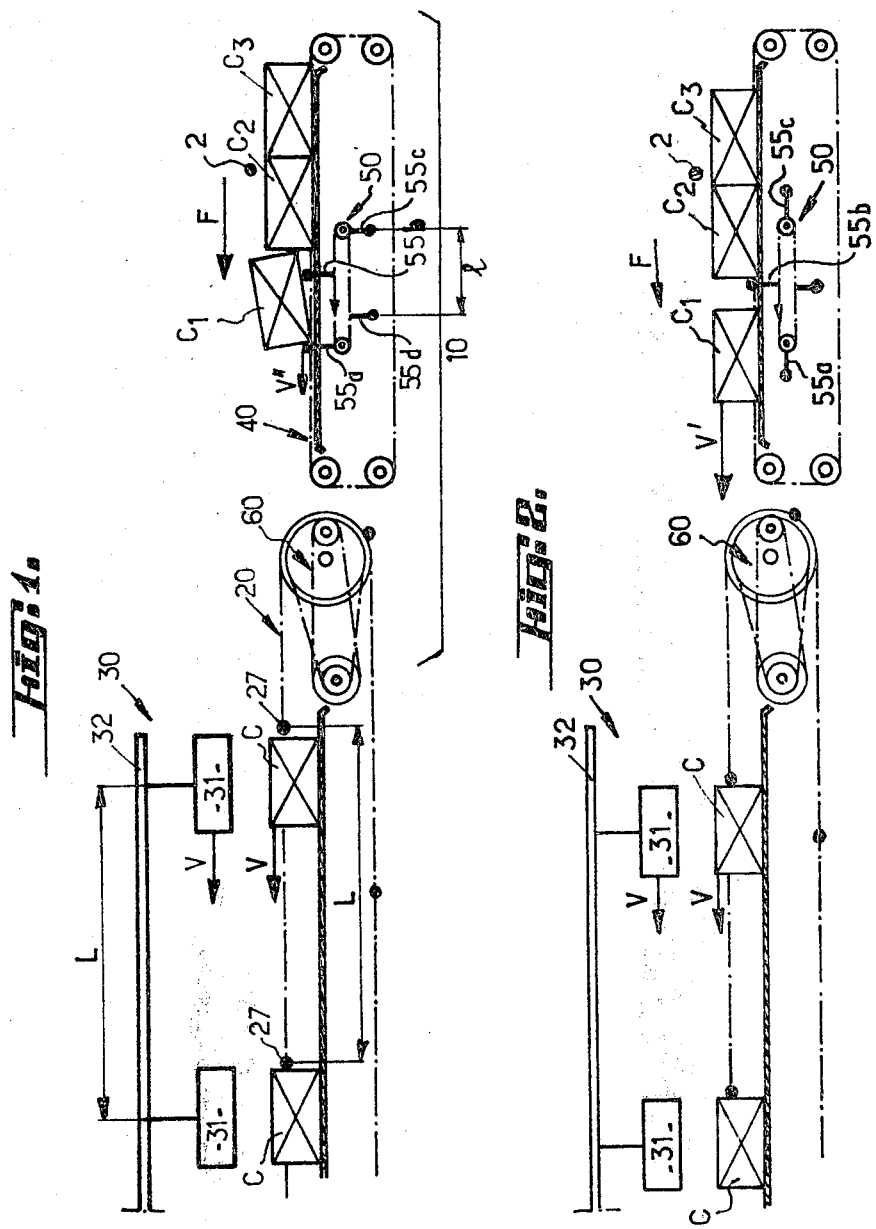

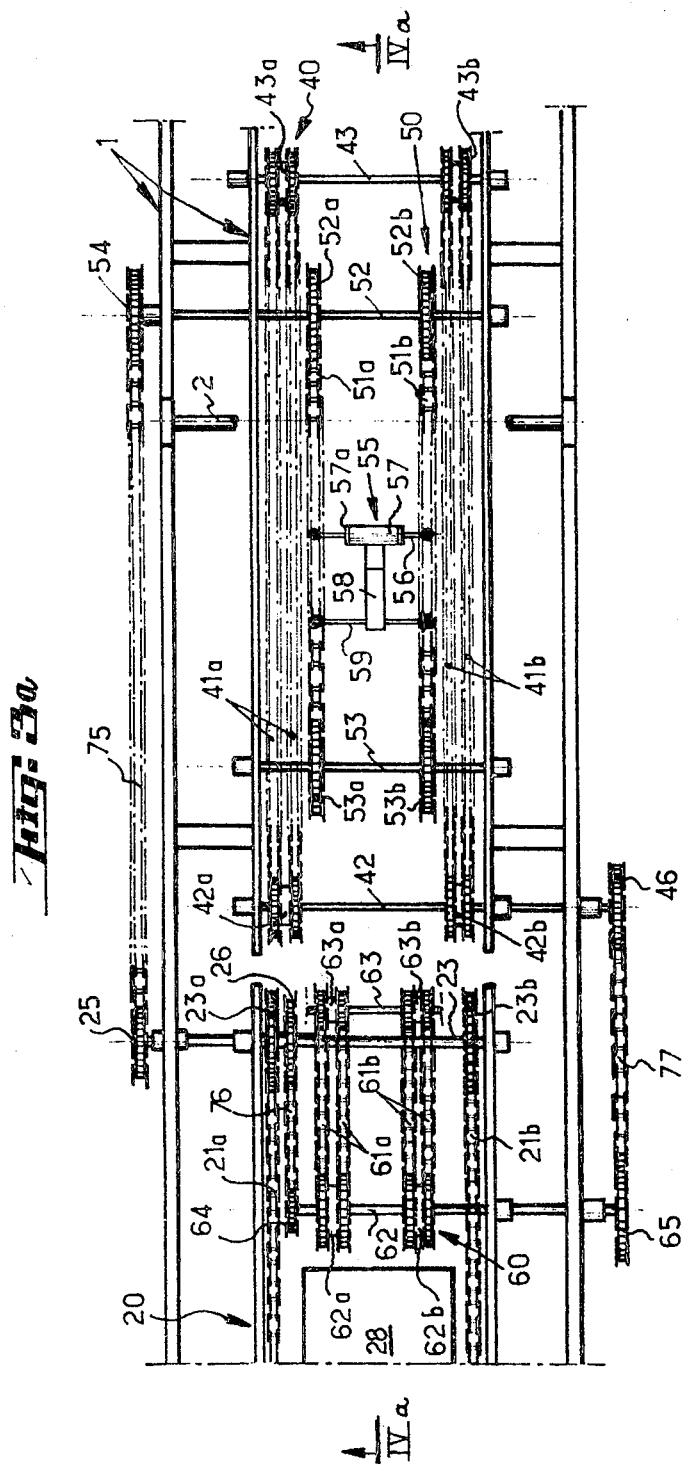

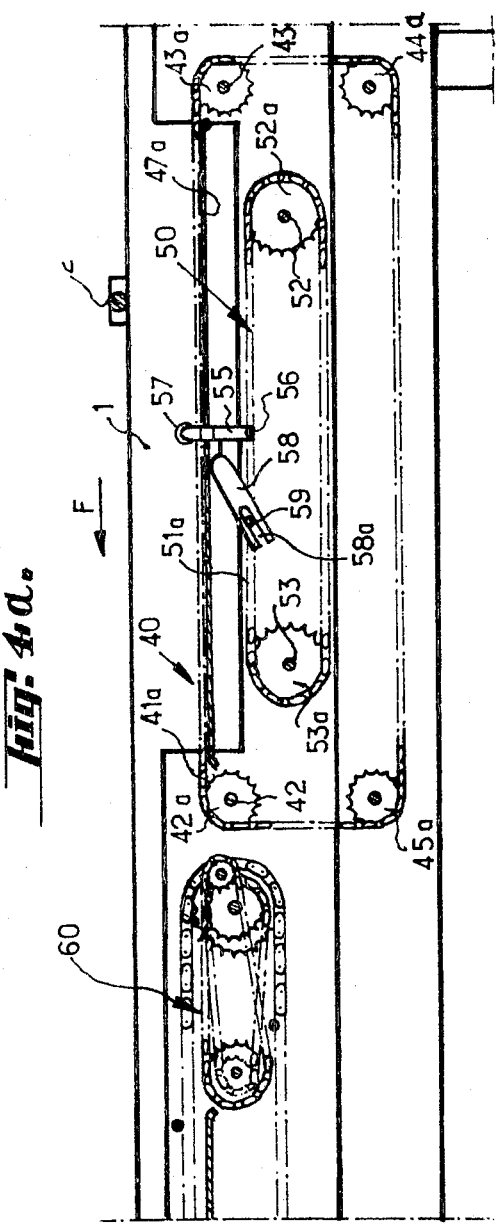

CONTINUOUSLY OPERATING DEVICE FOR CONVEYING AND SELECTING CASES

The present invention has essentially for its object a device for conveying cases, boxes, manufactured articles, and so forth, under the gripping members of an encasing-uncasing machine while they are travelling, at a constant speed, along a rectilinear trajectory element, of the type comprising a selector system designed to group the cases or the like driven in translation and distributed, at the start, in any manner whatsoever, and then to free them individually, and a conveyor located downstream of the selector system and provided with driving members moving in translation at a constant speed equal to that of the gripping members and distributed with a spacing equal to that of the said gripping members in order to selectively push each case or the like onto a rolling or sliding guideway so as to move it to a position straight below a gripping member.

Various types of devices are known to be used to equidistantly distribute articles, in particular bottle cases, driven by a conveyor so as to be conveyed to an encasing-uncasing machine.

Some of these devices are provided with retractable stops, placed at a fixed location, which stop and then free, at regular intervals, the cases or the like brought by the conveyor. A drawback of such devices is discontinuous advance of the cases or the like, resulting in impacts between the cases or between the cases and the stops. These impacts are a source of rapid deterioration of the members of the device and the cases themselves, as well as a source of considerable noise. Moreover, owing to the discontinuous operation of such devices, the driving speed has to be limited to a relatively low value.

There are also known devices using two sets of movable stops arranged on either side of the conveyor and the function of which is to laterally and alternately deviate the cases or the like with respect to one another so as to ensure a braking action of one or the other set of stops, alternately, on the said cases. Such devices require the use of a conveyor on which the cases can be displaced laterally, for example a roller conveyor, thus leading to a relatively complicated and costly installation. Moreover, such devices are difficult to operate owing to the necessity of laterally shifting the cases without imparting them an inclined position with respect to their direction of displacement.

The device according to the present invention has for its purpose to avoid the aforementioned drawbacks and is characterized in that the selector system comprises, in combination, a main conveyor designed to receive the cases or the like distributed at random and driven in translation at a constant speed much higher than that of the above-mentioned conveyor, a device for retaining the cases, provided with a series of tappets moving in translation in synchronism with a conveyor at a constant speed much lower than that of the said main conveyor and designed to project successively above the main conveyor so as to engage the trajectory of the cases, the said tappets being distributed with a spacing smaller than the length of a case or the like, so that each case driven by the main conveyor which meets a tappet by its front edge and is subjected to a braking action by the latter, exerts a braking action on the following cases and then is raised by the following tappet which engages its bottom before being freed by the first tappet and a conveyor for extracting the cases located downstream of the main conveyor and driven in translation at a constant speed equal to that of the latter, the said extracting conveyor receiving the cases delivered by the said main conveyor and the said retaining device and delivering them to the said conveyor.

The device according to the invention therefore permits continuous selection of the cases or the like, in synchronism with the conveyor bringing the said cases under the gripping members, thus creating, in a group of cases or the like arriving in continuous accumulation, a discontinuity which permits the separation of each case or the like from the following ones, the said discontinuity being ensured by the combined action of the tappets moving in synchronism with the conveyor placed downstream.

Each tappet therefore fulfils two functions: it imparts to each case an inclination with respect to a horizontal plane and the following cases, by raising it by its bottom, and then exerts a braking action on the following case which tends to move faster than itself, as well as those following it, by retaining it by its front edge.

It is seen that the device according to the invention comprises a single set of tappets, thus permitting considerable simplification with respect to the prior devices which must use two sets of movable stops placed on either side of the conveyor.

According to another feature of the invention, the said main conveyor is provided with a pair of endless carrying chains arranged in two parallel vertical planes and presenting a pair of upper horizontal sides located in one and the same plane and serving to support the cases or the like.

Such an endless chain conveyor is simpler and more economical in design than a motorized roll guideway. Moreover, the free space between the two carrying chains may be advantageously used to house some of the components of the device, thus enabling a more compact assembly to be obtained.

According to another feature of the invention, the device for retaining the cases comprises a system of endless chains driven in translation and arranged below the plane of the horizontal sides of the said main conveyor, the said chains carrying the aforesaid tappets which project above the said plane.

According to another feature of the invention, the system of endless chains of the retaining device comprises a pair of chains arranged in two parallel vertical planes and located between the chains of the main conveyor.

The free space between the chains of the main conveyor is therefore advantageously moved to house the retaining device.

According to still another feature of the invention, the conveyor for extracting the cases comprises a pair of endless carrying chains arranged in two vertical parallel planes and presenting a pair of horizontal upper sides located in the plane of the horizontal sides of the main conveyor.

Still according to the invention, the aforesaid conveyor is constituted by a pair of endless chains arranged in two vertical parallel planes arranged on either side of a rolling or sliding guideway and by transverse push-bars moving jointly with the said chains.

Other features and advantages of the invention will appear as the following description proceeds.

In the appended drawings given solely by way of example:

FIG. 1 illustrates the operating principle of a device according to the invention, the said device being shown diagrammatically, at a given instant during its operation;

FIG. 2 is identical with FIG. 1 which shows the said device at a later instant;

FIGS. 3a and 3b are partial and complementary top views of the device shown diagrammatically in FIGS. 1 and 2;

FIGS. 4a and 4b are sectional views upon the line IVa—IVa and IVb—IVb of FIGS. 3a and 3b.

Figure 3B:
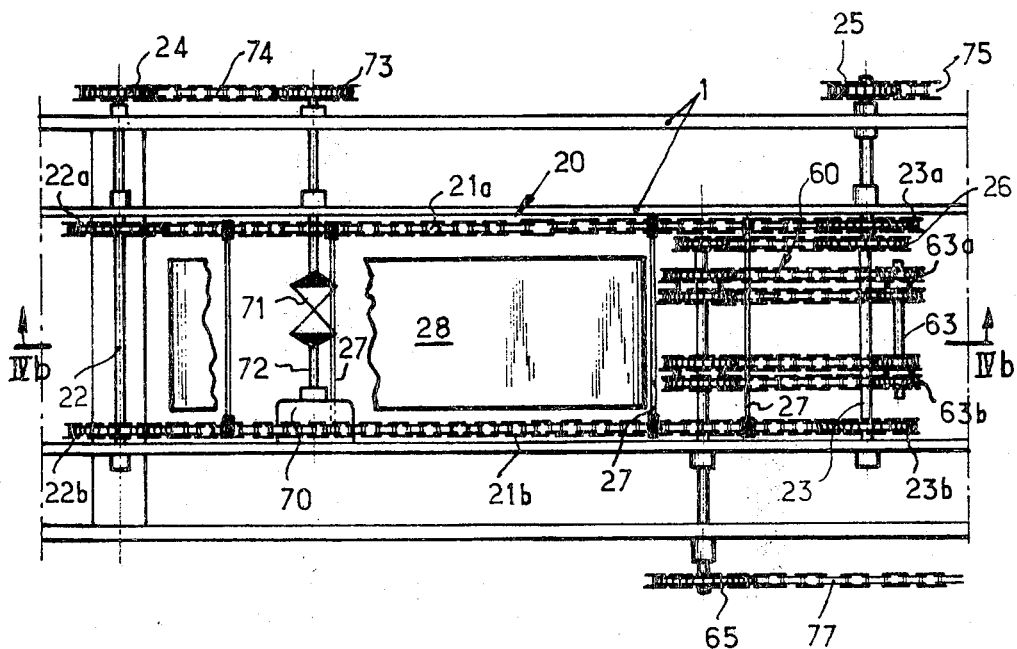

According to the form of embodiment illustrated in the appended drawings, the device for conveying cases or the like according to the invention, which is designed to drive the cases from the right to the left as indicated by the arrows F, comprises the following members mounted on a frame 1: a selector system designated generally by the reference numeral 10 and a conveyor, designated generally by the reference numeral 20, which is placed downstream of the selector system 10 with respect to the direction of displacement of the said cases. The device is associated with an encasing-uncasing machine shown diagrammatically at 30 and which comprises a plurality of gripping members 31 (only two of which are shown) arranged with a spacing L and each of which is adapted to grip a group of bottles to place them in the said cases or, on the contrary, to withdraw them therefrom. The gripping members 31 are mounted, in a known manner, on a rotating device including endless chains 32 which drive them along a closed circuit, at a constant translation speed V, along a trajectory comprising two rectilinear portions, one of which is located above the conveyor 20 whereas the other is located above a conveyor belt or the like (not shown) serving to convey the bottles.

The selector device 10 is itself constituted by a main conveyor designated generally by the reference numeral 40, a device for retaining the cases, designated generally by the reference numeral 50 and which is provided with a plurality of equidistant tappets 55a, 55b, 55c, 55d and a conveyor for extracting the cases designated generally by the reference numeral 60. The cases conveyed by the conveying device to locations under the gripping members 31 of the encasing-uncasing machine are shown at C.

Figure 4B:
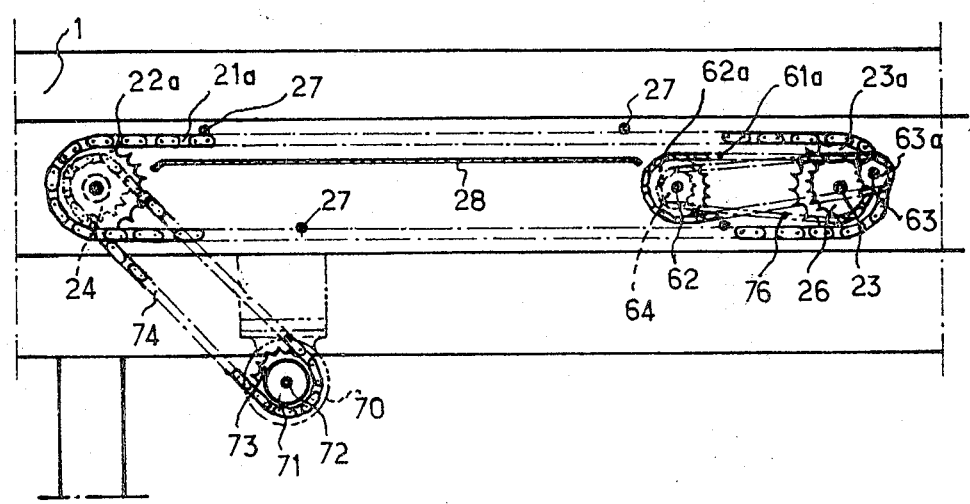

The various components of the conveying device, i.e. the conveyor 20, the main conveyor 40, the retaining device 50 and the extracting conveyor 60, which together constitute the selector system, will now be described more in detail with reference to FIGS. 3a, 3b and 4a, 4b.

The conveyor 20 comprises essentially a pair of endless chains 21a and 21b arranged in two vertical parallel planes and each of which passes round two pinions 22a, 23a and 22b, 23b respectively. The pinions 22a and 22b, which are driving pinions, are supported by one and the same shaft 22 mounted on the frame 1, the said shaft carrying at one of its ends a driving pinion 24, whereas the pinions 23a and 23b, which are driven pinions, are carried by a shaft 23 which is also mounted on the frame 1 and is provided with two transmission pinions 25 and 26. To the endless chains 21a and 21b are attached push-bars 27 parallel and equidistant from one another, the spacing between the said pushbars being equal to the spacing L of the gripping members. Between the two chains 21a and 21b is mounted a slide sheet 28 supporting the cases.

The main conveyor 40 is constituted essentially by a pair of carrying endless chains 41a, 41b of the duplex or combined type, arranged in two vertical parallel planes. Each of the duplex chains 41a and 41b passes round two main duplex or combined pinions 42a, 43a and 42b, 43b, respectively, and round two tightening duplex pinions 44a, 45a and 44b, 45b respectively, the said pinions, 42a, 43a, 44a, 45a, on the one hand, and 42b, 43b, 44b, 45b, on the other hand, being placed at the four vertices of a quadrilateral. The pinions 42a and 42b, which are driving pinions, are supported by one and the same shaft 42 mounted on the frame 1 and carrying at one of its ends a driving pinion 46, whereas the pinions 43a and 43b; which are driven pinions, are carried by one and the same axis 43 freely mounted on the frame 1. The two duplex chains 41a and 41b have their upper rectilinear sides placed in one and the same horizontal plane, the said upper horizontal sides being adapted to receive the cases. The upper horizontal sides of the carrying chains 41a and 41b are supported by skids or flat sliding bars such as 47a which limit their bending under the action of the weight of the cases.

The device for retaining the cases 50 is constituted essentially by a pair of endless chains 51a and 51b arranged in two vertical parallel planes. Each of the chains 51a and 51b passes round two pinions 52a, 53a and 52b, 53b, respectively. The pinions 52a and 52b, which are driving pinions, are supported by one and the same shaft 52 rotatably mounted on the frame 1 and carrying at one of its ends a driving pinion 54, whereas the pinions 53a and 53b, which are driven pinions, are carried by a shaft 53 mounted freely on the frame 1. This arrangement, owing to the continuous pushing action of the upstream cases, enables the upper side of the chains 51a and 51b to be kept stretched and thus work in a stretched state and not in a compressed state. The chains 51a and 51b carry a certain number of tappets such as 55, each of which is rotatably mounted on a cross-member or the like 56 bracing the said chains and attached to the latter at both its ends. Each tappet 55 is provided at its upper portion with a roller 57 carried by a yoke 57a and is provided with a forkshaped arm or the like 58 having at its free front end a slot or notch 58a which is engaged on a guiding bar 59 which also is secured at its ends to the chains 51a and 51b and extends in parallel relationship to the cross-member 56 and ahead of the latter with respect to the direction of translation of the chains indicated by the arrow F. Each tappet is thus supported by the cross-member 56 and the guiding bar 59 at two relatively spaced points of the chains 51a and 51b, thus being firmly maintained and enabled to lift even heavily loaded cases. Moreover, this arrangement enables the tappet to be rotated, i.e. retracted, when it reaches the end of its travel, thus improving the synchronism with the push-bars 27 of the conveyor 20. The tappets 55, only one of which is shown in FIGS. 3a and 4a, are equidistantly distributed on the chains 51a and 51b, the distance between two successive tappets depending upon the length of the cases conveyed by the main conveyor 40, the said distance, as pointed out previously, having to be slightly smaller than the said length of the cases. In the form of embodiment illustrated, four tappets such as 55 are provided on the chains 51a and 51b, the said four tappets being shown in FIGS. 1 and 2 and designated by the reference numerals 55a, 55b, 55c, and 55d, the spacing therebetween being indicated by the reference letter l.

The device 50 for retaining the cases is placed, as seen in the drawings, between the two carrying chains 41a and 41b of the main conveyor 40, substantially below the horizontal plane in which are located the upper sides of the chains 41a and 41b, but in such a manner that the upper end of the tappets 55 carrying the rollers 57 project above the plane of the said upper horizontal sides.

The extracting conveyor 60 is constituted essentially by a pair of endless chains 61a and 61b of the duplex type, arranged in two parallel vertical planes. Each of the duplex chains 61a and 61b passes round two duplex pinions 62a, 63a and 62b, 63b, respectively. The pinions 62a and 62b, which are driving pinions, are supported by one and the same shaft 62 mounted on the frame 1 and carrying at one of its ends a driving pinion 64 and at its other end a transmission pinion 65, whereas the pinions 63a and 63b, which are driven pinions, are carried by a shaft 63 freely mounted on the frame 1. Like the duplex chains 41a and 41b of the main conveyor, the duplex chains 61a and 61b of the extracting conveyor 60 are carrying chains, the two upper rectilinear sides of which, located in one and the same horizontal plane, are intended to receive the cases conveyed by the said main conveyor. The extracting conveyor 60 is placed between the chains 21a and 21b of the conveyor 20, the upper horizontal sides of its chains 61a and 61b being located in the same plane as the upper horizontal sides of the chains 41a and 41b and the sliding sheet 28.

There is also provided, above the main conveyor 40 and slightly upstream of the retaining device 50, a roller 2 retaining the cases and secured to the frame 1 at a preferably adjustable distance, from the upper sides of the chains 41a and 41b which is slightly greater than the height of the cases.

The various members constituting the conveying device, i.e. the conveyor 20, the main conveyor 40, the retaining system 50 and the extracting conveyor 60 are driven in synchronism so as to ensure a continuous displacement of the cases.

The system ensuring this synchronized drive includes essentially a single motor 70, for example an electric motor, which, through the medium of a cardan transmission 71 connected to its output shaft 72, of a pinion 73 and of a transmission chain 74, drives the pinion 24 of the conveyor 20. The shaft 23 of the conveyor 20, driven by the drive shaft 22 through the medium of chains 21a and 21b, itself drives, through the medium of the pinion 25, the transmission chain 75 and the pinion 54, the retaining device 50 and, through the medium of the pinion 26, the transmission chain 76 and the pinion 64, the extracting conveyor 60, which in its turn drives, through the medium of the pinion 65, the transmission chain 76 and the pinion 46, the main conveyor 40. The gear ratios are so selected as to enable the chains 61a and 61b of the extracting conveyor and the carrying chains 41a and 41b of the main conveyor to be driven at one and the same speed V', this speed being much higher (on the order of from 30 to 40 %) than the speed V of the chains 21a and 21b of the conveyor 20 and the gripping members 31. On the other hand, the chains 51a and 51b carrying the tappets 55 are driven at a speed V'' which is much lower than the speed V' of the carrying chains 43a and 43b, according to the relation: $V'' = V \times l/L$.

The operation of the device is as follows: the cases designated generally by the reference letter C are placed, at random distances from one another, on the carrying chains 41a and 41b of the main conveyor 40 which drives them at a speed V'. A case such as $C_1$ (see FIGS. 1 and 2) which meets a tappet 55 moving at a speed V'' is subjected to the braking action of the latter, so that it is rejoined by the cases $C_2$ and $C_3$ which follow it and are in their turn subjected to a braking action and, therefore, gather behind it, so that the pushing action of all the cases from $C_1$ to $C_3$ driven by the main conveyor results in the downstream case $C_1$ being applied against the tappet 55a. When the following tappet 55b comes into action in its turn, i.e. projects above the plane of the upper horizontal sides of the chains 41a and 41b, it engages the bottom portion of the case $C_1$ and therefore raises the latter and tilts it forwardly as shown in FIG. 1. It will be noted that the following case $C_2$ is prevented from being driven upwardly by the case $C_1$ owing to the stationary retaining roll 2. The tappet 55a then withdraws and frees the case $C_1$ which it retained; under the pushing action of the case $C_2$ and also of the following ones, and owing to the driving action of the carrying chains 41a and 41b, this last case $C_1$ returns to its horizontal position; it is then driven at the speed V' and arrives on the chains 61a and 61b of the extracting conveyor a little after the passage of a push-bar 27. Simultaneously, the following case $C_2$ abuts against the tappet 55b in projecting position. The case $C_1$ which has been conveyed at the higher speed, first by the carrying chains 41a and 41b and then by the chains 61a and 61b, moves by inertia onto the sliding plate 28, awaiting the following push-bar. The case then remains on the sliding sheet until it is contacted by the following push-bar which drives it on the said sheet in synchronism with the gripping members and straight below the latter, so that it can be filled with bottles, or the bottles can be removed therefrom, as the case may be.

It should be noted that the fact that four tappets are provided, always enables at least one tappet to be engaged to serve as an abutment for the case $C_2$ (see FIG. 2) and at most two tappets to be engaged, one of which serves as an abutment for the case $C_1$ and the other raises the back of this same case until it can serve as an abutment for the case $C_2$ (see FIG. 1).

It is obvious that the synchronization must be performed in such a manner as to enable each tappet to free the case retained thereby and the front of this case to arrive a little after the preceding push-bar but much before the following pushbar which will be the one that will practically drive it under the gripping members, when the said case is located on the chains 61a and 61b of the extracting conveyor. In order that this fixing may be readily obtained, use can be made of a tappet-chain driving pinion provided with an adjustable hub.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention and used within the scope of the following claims.

What is claimed is:

1. A device for conveying cases containing articles of manufacture to an encasing-uncasing machine including gripping members travelling at a constant speed along a rectilinear trajectory element and adapted to grip said articles for placing them in said cases or withdrawing same therefrom, said device comprising in combination: first conveyor means arranged substantially beneath said machine and comprising driving members moving in translation at a constant speed equal to that of said gripping members to selectively push each case to a position straight below a said gripping member; main conveyor means placed upstream of said first conveyor means, adapted to receive the cases distributed in a random manner thereon and driving same at a constant speed, much higher than the speed of said first conveyor means; a device for retaining the cases, provided with series of tappets moving in translation at a constant speed much lower than that of said main conveyor means and being adapted to project successively above said main conveyor means by engaging the trajectory of the cases and in synchronism with said driving members of said first conveyor means; said tappets being distributed with a spacing smaller than the length of a case, so that each case, driven by said main conveyor, which meets a tappet by its front edge and is subjected to a braking action by the latter, exerts a braking action on the case following it by direct contact therewith, and then is raised by the following tappet which engages its bottom portion before it is freed by the first tappet; conveyor means for extracting the cases, placed downstream of the said main conveyor means and driven in translation at a constant speed equal to that of the latter, said extracting conveyor receiving the cases delivered by said main conveyor means and the said retaining device, and delivering them to the said first conveyor means; and driving means common to the aforesaid conveyor means, and retaining device to drive them at their said speeds.

2. A device according to claim 1, wherein said retaining device includes a pair of endless chains, at least a cross member bracing said chains and moving jointly with the latter, and at least a guiding bar parallel with said cross-member and attached to said chains ahead of the said cross-member with respect to the direction of translation of the chains, and said tappets are pivotally mounted on said cross-member and are provided with an arm having a forked end portion engaging said guiding bar.

3. A device according to claim 1, wherein said main conveyor comprises a pair of endless carrying chains supporting the cases, and said retaining device includes chains located between the chains of the main conveyor.

4. A device according to claim 3, wherein each of said chains of the main conveyor passes round four pinions arranged at the four vertices of a rectangle.

5. A device according to claim 2, wherein each tappet is provided at its free end with a roller adapted to come into contact with the case.

6. A device according to claim 1, wherein said first conveyor means is constituted by a pair of endless chains arranged in two parallel vertical planes and comprises a sliding guideway arranged between said chains and transverse push-bars moving jointly with the latter.

7. A device according to claim 1, wherein said first conveyor includes chains and a sliding guideway and wherein said extracting conveyor is arranged between said chains of the first conveyor means, upstream of the said sliding guideway.

8. A device according to claim 1, wherein said first conveyor means, said main conveyor, said retaining device and said extracting conveyor are driven by a common motor.

* * * * *